United States Patent
Schumann (10) Patent No.: US 11,019,226 B2
(45) Date of Patent: May 25, 2021

(54) METHOD FOR FAST ELIMINATION OF IMAGE DISTORTIONS WHILE INSPECTING IMAGES ON PRINTED PRODUCTS IN A PRINTING MACHINE

(71) Applicant: HEIDELBERGER DRUCKMASCHINEN AG, Heidelberg (DE)

(72) Inventor: Frank Schumann, Heidelberg (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 0 days.

(21) Appl. No.: 16/696,224

(22) Filed: Nov. 26, 2019

(65) Prior Publication Data
US 2020/0169641 A1 May 28, 2020

(30) Foreign Application Priority Data
Nov. 26, 2018 (DE) .......................... 10 2018 220 236

(51) Int. Cl.
*H04N 1/00* (2006.01)
*G06T 7/00* (2017.01)

(52) U.S. Cl.
CPC ......... *H04N 1/00045* (2013.01); *G06T 7/001* (2013.01); *H04N 1/00015* (2013.01); *H04N 1/00084* (2013.01); *G06T 2207/30144* (2013.01)

(58) Field of Classification Search
CPC ........... H04N 1/00045; H04N 1/00015; H04N 1/00084; G06T 7/001; G06T 2207/30144; G06T 2207/20021; G06T 7/32; G06K 9/6202; G06K 9/036; B41F 33/0036
See application file for complete search history.

(56) References Cited

U.S. PATENT DOCUMENTS

| 5,506,793 A | 4/1996 | Straayer et al. |
| 5,592,573 A | 1/1997 | Eisenbarth et al. |
| 6,665,424 B1 | 12/2003 | Stringa |

(Continued)

FOREIGN PATENT DOCUMENTS

| DE | 69323512 T2 | 9/1999 |
| DE | 69913274 T2 | 11/2004 |

(Continued)

*Primary Examiner* — Juan M Guillermety
(74) *Attorney, Agent, or Firm* — Laurence A. Greenberg; Werner H. Stemer; Ralph E. Locher (57) ABSTRACT

A method for inspecting images on printed products in a machine for processing printing substrates includes recording and digitizing the produced printed products by using at least one image sensor in an image recording system, comparing the recorded digital printed images having been created in this way with a digital reference image by using the computer, digitally eliminating distortion in the recorded digital printed images beforehand by using the computer and, if the recorded digital distortion-free printed images deviate from the digital reference image, removing printed products having been found to have a defect. For the purpose of digitally eliminating the distortions, the computer divides the print and reference images into respective image parts and adapts the printed image parts pixel by pixel in terms of their positions in the printed image to minimize the difference between the printed image parts and the respective reference image parts.

8 Claims, 8 Drawing Sheets

(56) References Cited

U.S. PATENT DOCUMENTS

| | | | |
|---|---|---|---|
| 8,036,733 B2* | 10/2011 | Takizawa | A61B 5/02405 |
| | | | 600/509 |
| 9,953,435 B2 | 4/2018 | Fergen et al. | |
| 2014/0009577 A1 | 1/2014 | Wakabayashi et al. | |
| 2015/0078627 A1* | 3/2015 | Fukase | G06T 7/001 |
| | | | 382/112 |
| 2015/0294190 A1 | 10/2015 | Courtney et al. | |
| 2017/0169584 A1* | 6/2017 | Fergen | G06T 7/001 |
| 2019/0149692 A1 | 5/2019 | Schweger | |
| 2019/0246005 A1 | 8/2019 | Fergen et al. | |

FOREIGN PATENT DOCUMENTS

| | | |
|---|---|---|
| DE | 102016224307 A1 | 6/2017 |
| DE | 102018201794 B3 | 4/2019 |
| DE | 102018217362 A1 | 5/2019 |
| JP | 2010249565 A | 11/2010 |
| JP | 6379410 B1 | 8/2018 |

* cited by examiner

METHOD FOR FAST ELIMINATION OF IMAGE DISTORTIONS WHILE INSPECTING IMAGES ON PRINTED PRODUCTS IN A PRINTING MACHINE

CROSS-REFERENCE TO RELATED APPLICATION

This application claims the priority, under 35 U.S.C. § 119, of German Patent Application DE 10 2018 220 236.2, filed Nov. 26, 2018; the prior application is herewith incorporated by reference in its entirety.

BACKGROUND OF THE INVENTION

Field of the Invention

The present invention relates to a method of inspecting images on printed products in a printing machine.

The technical field of the invention is the field of quality control.

In today's printing industry, in particular in larger printing machines, quality control is carried out in an automated way by so-called in-line inspection systems, which will herein be referred to as image recording systems. In that context, in-line means that the image recording system or, to be more precise, the camera of the image recording system, is disposed in the printing machine. Usually, the camera is provided downstream of the last printing unit or downstream of a further processing unit such as a varnishing unit, if such a unit is provided. The camera scans the printed products that are created in the machine. There may be a single camera or a camera system with multiple cameras. The use of other image sensors is likewise possible. However, for reasons of simplicity, only the term "camera" will be used in the present document. An image processor then compares the digitized printed images the camera has created in that way to corresponding good images of the image to be printed. Those good images may be created from pre-press data or taught in. In that context, teaching-in or training means that a number of printed products bearing the image to be printed are printed and recorded by the camera of the image recording system. Those sample prints ought to be as defect-free as possible and, having been recorded by the image recording system, they are therefore saved for reference as good images on the image processor. In the production run, the camera of the image recording system records the created print or parts thereof, which are then compared to the good reference image that has been digitally taught-in or obtained from pre-press data. If deviations between the printed products created in the production run and the digital reference are found, the operator is informed of the deviations and may then decide whether the deviations are acceptable or whether the printed products that have been created in that way are waste and need to be removed. The printed sheets that have been classified as waste may be removed by a waste removal switch. In that context it is of major importance to ensure both that the reference image is without defects and that the actual print that has been recorded by the image recording system truly corresponds to the actual printed image. Defects that are created by the image recording system, for instance due to a lack of illumination, a contaminated lens of the camera, or other influences, must not have any negative influence on the inspection process.

A very specific problem that has a negative effect on the inspection process in precisely that respect is that irregularities may occur when the printing substrate is transported within the printing machine. In order to make high-quality recordings, the image recording system needs the printing substrate to be transported past the camera of the image recording system as smoothly and evenly as possible. That is a great challenge especially for sheet-fed printing machines. A known problem in that context is that the trailing edge of print sheets that are being transported starts to vibrate as it is transported over the sheet-guiding plate—it may flip upward and start to "flutter." Although the fluttering does not cause any problems for the recording of the leading and central regions of the sheet, it has a negative effect on the recording of images that are located at the trailing end of the print sheet. The fluttering causes the distance between the sheet surface and the camera to change, resulting in non-linear distortion in the recorded printed image. Since that distortion is of course not present in the digital reference image, it is classified as a print defect when the recorded printed image is compared to the digital reference. If the image inspection process is supervised by operating staff, they will realize that the distortion is not an actual print defect and will classify the indicated defects accordingly. However, for a fully automated image inspection process, such false positives or pseudo-defects need to be eliminated in advance and in synchronism with the printing speed.

In order to solve that problem, German Patent Application DE 10 2018 201 794 A, corresponding to U.S. Patent Application Publication No. 2019/0246005, discloses a method for inspecting images on printed products in a machine for processing printing materials by using a computer, wherein in the course of the image inspection process, an image recording system records the produced printed products by using at least one image sensor to digitize them. The recorded digital prints that have been created in that way are compared to a digital reference image by using the computer after the computer has smoothed the digital reference image. If the recorded digital prints deviate from the digital reference image, the printed products that have been found defective are removed. The method is distinguished in that before the digital reference image is smoothed, the computer compares the recorded digital prints with the digital reference image, analyzes the result of the comparison to find image areas with blurred areas in the recorded digital print, calculates suitable smoothing factors for those blurred image areas and uses the calculated suitable smoothing factors to smooth the blurred image areas so that those image areas of the digital reference image have a similar blurredness to the recorded digital print. In that case, typically two images that do not exactly match may be subjected to a distortion elimination process with the aid of so-called keypoint algorithms. In that process, a defined number of keypoints is identified in a target image. Those points are then likewise identified in the image to be subjected to the distortion elimination process. The positional deviations of the keypoints may then be used to calculate the distortion elimination parameters. However, the search for so-called keypoints is very time-consuming and does not provide good results in the case of images that have few corner points.

German Patent Application DE 10 2017 220 322 A, corresponding to U.S. patent application Ser. No. 16/157,160, filed Oct. 11, 2018, discloses a method for compensating for substrate shrinkage during a printing operation in a printing machine by using a computer, the method including the steps of generating multiple image parts of a digitally available image to be produced, factoring in information on substrate shrinkage by subdivision by using the computer, subdividing the respectively generated multiple image parts into a number of data blocks by using the computer, saving actual positions of all data blocks in the digital image by using the computer, calculating target positions of all data blocks in the digital image by using the computer by shifting the data blocks away from one another by one pixel to create single-pixel-wide gaps between the data blocks in the digital image, copying and rearranging the data blocks in the digital image in accordance with the calculated target positions by using the computer, calculating positions of the resultant single-pixel-wide gaps by using the computer, filling the single-pixel-wide gaps with digital image data of neighboring pixels by using the computer, and printing the compensated digital image on the printing machine. However, that method does not deal with image inspection, i.e. there is no comparison between a camera image and a reference image.

SUMMARY OF THE INVENTION

It is accordingly an object of the invention to provide a method for fast elimination of image distortions while inspecting images on printed products in a printing machine, which overcomes the hereinafore-mentioned disadvantages of the heretofore-known methods of this general type, namely a distortion elimination method that yields better results than the methods known from the prior art.

With the foregoing and other objects in view there is provided, in accordance with the invention, a method for inspecting images on printed products by using a computer in a machine for processing printing substrates, wherein the image inspection process comprises the steps of recording and digitizing the produced printed products by using at least one image sensor in an image recording system, comparing the recorded digital printed images that have been created in this way with a digital reference image by using the computer, subjecting the recorded digital printed images to a digital distortion elimination process beforehand by using the computer, in a case in which the recorded digital distortion-free printed images deviate from the digital reference image, removing printed products that have been found to have a defect, and for the purpose of digitally eliminating distortions, the computer divides the print and reference images into respective image parts and adapts the printed image parts pixel by pixel in terms of their positions in the printed image in such a way that the difference between the printed image parts and the respective reference image parts is minimal. The main aspect of the method of the invention is the subdivision into image parts. In this process, both the recorded, digitized printed image and the reference image for comparison purposes are divided into image parts. Then, a comparison is made between the printed image and the reference image. In this context, an aspect of particular importance is that the individual printed image parts are shifted in the entire printed image in a pixel-by-pixel way until the printed image part that has thus been shifted pixel by pixel matches the corresponding reference image part in the best possible way. This process is carried out for all printed image parts. The aim is to provide an entire printed image that has the smallest deviations from the reference image. This way to proceed will only be useful if there actually are corresponding distortions in the recorded, digitized printed image. Otherwise, the individual image parts would be torn apart like a jigsaw puzzle—a process that would rather diminish the quality of the digital printed image. If there are distortions, however, they may be compensated for very well due to the pixel-by-pixel positional adaptation of the printed image parts. Thus, the comparison to find the minimum difference from the reference image part also ensures that the shifting of the position of the printed image part in the entire printed image does not reduce the quality of the digital printed image but always enhances it.

Advantageous and thus preferred further developments of the method will become apparent from the associated dependent claims and from the description together with the associated drawings.

Another preferred development of the method of the invention in this context is that the image parts of print and reference images are of identical size. The comparison between printed image parts, the positions of which may have been adapted, and reference image parts naturally only works if the sizes of the printed image part and the corresponding reference image part are identical. Yet it is not necessary for the individual image parts within the printed image and within the reference image to be of the same size. The digital printed image and consequently the corresponding reference image, too, may be divided into image parts of different sizes. The only important aspect is that the respective pair of printed image part and corresponding reference image part, i.e. the parts that are to be compared to one another, need to be of the same size.

A further preferred development of the method of the invention in this context is that the computer divides the printed images into image parts that overlap. In the end, this means that the digital printed image is divided into image parts that virtually have two frames. On one hand, there is an inner frame that limits the actual printed image part that is to be compared to the reference image part of precisely the same size. On the other hand, there is something like an outer frame that overlaps with neighboring printed image parts. Thus, the entire digital printed image is divided into a set of printed image parts, the outer frame of which overlaps with the neighboring printed image parts above, below, to the left, and to the right. This is necessary to be able to shift the actual printed image part that is covered by the inner frame and identical in size with the reference image part by a number of pixels in all directions. Without this overlapping portion of the respective printed image part, a shifting of the image parts would create gaps in the entire digital printed image. Such gaps need to be avoided for the comparison between the printed image and the reference image.

An added preferred development of the method of the invention in this context is that the degree of overlap between individual image parts of the printed images corresponds to the degree of the maximum positional adaptation. It goes without saying that the printed image part with the inner frame may be shifted pixel by pixel only as long as there are image data available between the inner frame and the outer frame in the printed image part due to the overlap. If the printed image part is shifted by more than the degree of overlap with the neighboring printed image parts, there will again be gaps in the printed image part to be compared.

An additional preferred development of the method of the invention in this context is that the computer carries out the pixel-by-pixel positional adaptation as a shift of the printed image part in the x and/or y directions. That is to say that the printed image part in the inner frame may be shifted upward, downward, to the left, or to the right or, in other words, in the printing direction, against the printing direction, and perpendicular to the printing direction. Other shifts, for instance in a direction diagonal to the x or y axis, are theoretically possible, but less preferable.

Another preferred development of the method of the invention in this context is that for a positional adaptation to attain a minimum difference between the printed image parts and the respective reference image parts, the computer makes multiple shifts, creates a differential image relative to the reference image part for every shift of the printed image part, and then selects the shifted printed image part having a differential image that has the smallest difference. This is another core aspect of the method of the invention. In order to find the optimum position of the respective printed image part in the inner frame, a comparison between the printed image part and the reference image part, multiple subsequent shifts of the printed image part and, depending on the shift, a renewed comparison with the reference image part need to be made. These steps are necessary for the computer to find the optimum printed image part shift for the final comparison with the reference image part. In general, fixed rules on how to shift a specific printed image part should be defined and applied to every printed image part.

A further preferred development of the method of the invention in this context is that the computer calculates the smallest difference in the differential image by applying thresholds and saves the difference value of every shifted printed image part in a result matrix. The calculation of the smallest difference may be made in such a way that the computer applies defined thresholds and marks the respective differential image that falls below a corresponding threshold as the one that has the smallest difference. The results are then saved in a matrix to be able to further analyze the efficiency of the method of the invention.

An added preferred development of the method of the invention in this context is that to carry out an image inspection based on a distortion-free printed image, the computer copies the printed image parts with the smallest difference into the respective target position in the printed image and uses the image obtained in this way for the image inspection process. For the final image inspection process, in the end the respective entire printed image is reassembled out of the corresponding printed image parts that have the smallest difference from the respective reference image part. This assembled entire printed image is then used to compare the entire printed image and the reference image in the course of the image inspection process.

In an additional preferred development of the method of the invention, it is alternatively possible to carry out an image inspection on the basis of a distortion-free printed image by comparing the printed image parts that have the smallest difference directly to their respective reference image counterparts. If the entire digitally recorded printed image is present in multiple camera sections, it is likewise possible to insert an intermediate step of subjecting the respective camera section images to an intermediate treatment step in accordance with the invention, i.e. to a distortion elimination and/or inspection step. In this case, the reference image, too, would have to be divided into corresponding sections to be able to carry out the distortion elimination process of the invention.

A concomitant preferred development of the method of the invention in this context is that the image parts are polygonal in shape, in particular rectangles, squares or triangles. Various shapes of the image parts are conceivable. Polygonal shapes, in particular squares, have turned out to be expedient. However, different shapes, for instance rectangular shapes or triangular shapes, are likewise possible. Since the entire digital printed image is to be divided, circular shapes are less suitable.

Other features which are considered as characteristic for the invention are set forth in the appended claims.

Although the invention is illustrated and described herein as embodied in a method for fast elimination of image distortions while inspecting images on printed products in a printing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

The invention as such as well as further developments of the invention that are advantageous in structural and/or functional terms will be described in more detail below with reference to the associated drawings and based on at least one preferred exemplary embodiment.

DETAILED DESCRIPTION OF THE INVENTION

Figure 1:
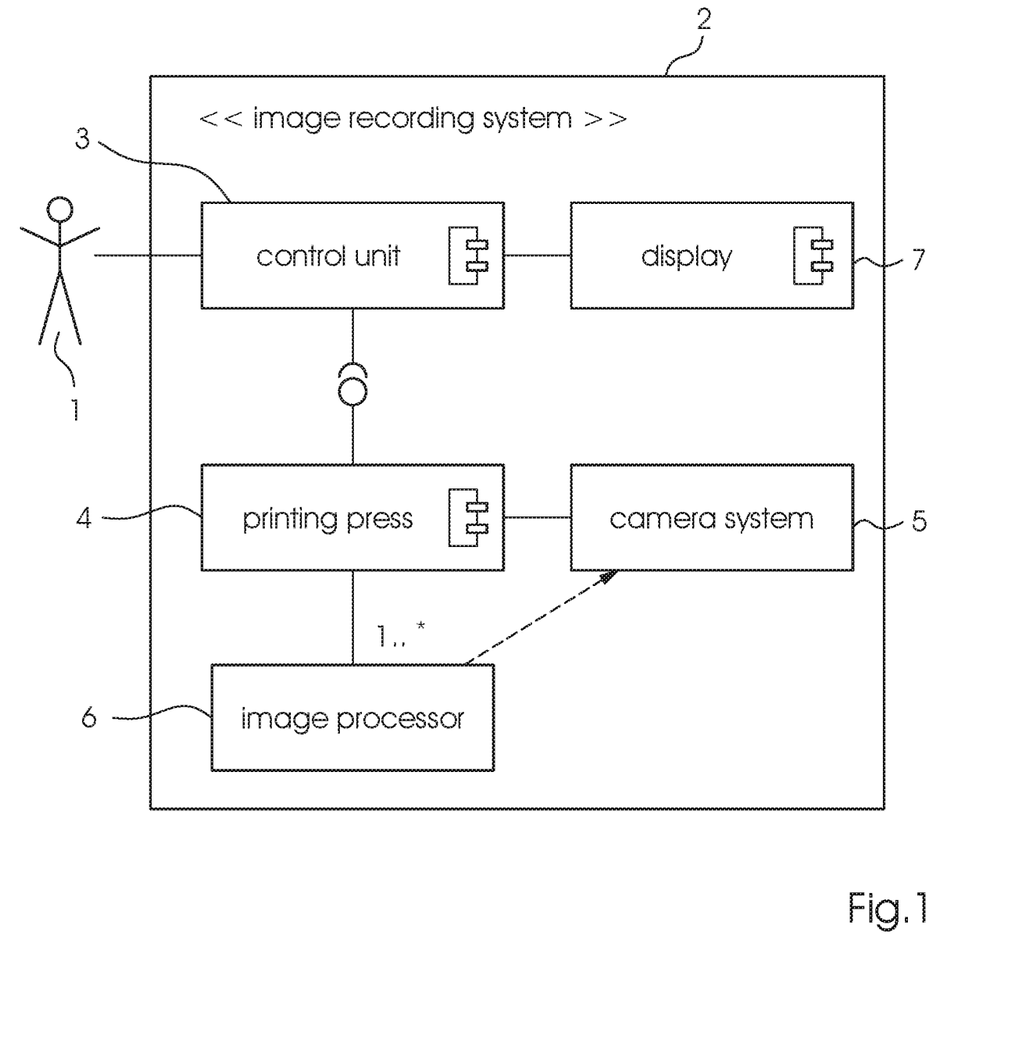
FIG. 1 is a block diagram of an example of an image recording system in a lithographic offset printing machine.

Referring now in detail to the figures of the drawings, in which mutually corresponding elements have the same reference symbols, and first, particularly, to FIG. 1 thereof, there is seen an example of an image recording system 2 implementing the method of the invention. The image recording system 2 is formed of at least one image sensor 5, usually a camera 5, which is a part of a sheet-fed printing machine 4. The at least one camera 5 records printed images generated by the printing machine 4 and transmits data to a computer 3, 6 for analysis. This computer 3, 6 may be a standalone computer 6, e.g. one or more dedicated image processors 6, or it may be identical with a control unit 3 of the printing machine 4. At least the control unit 3 of the printing machine 4 has a display 7 for displaying the results of the image inspection process to an operator 1.

Figure 9:
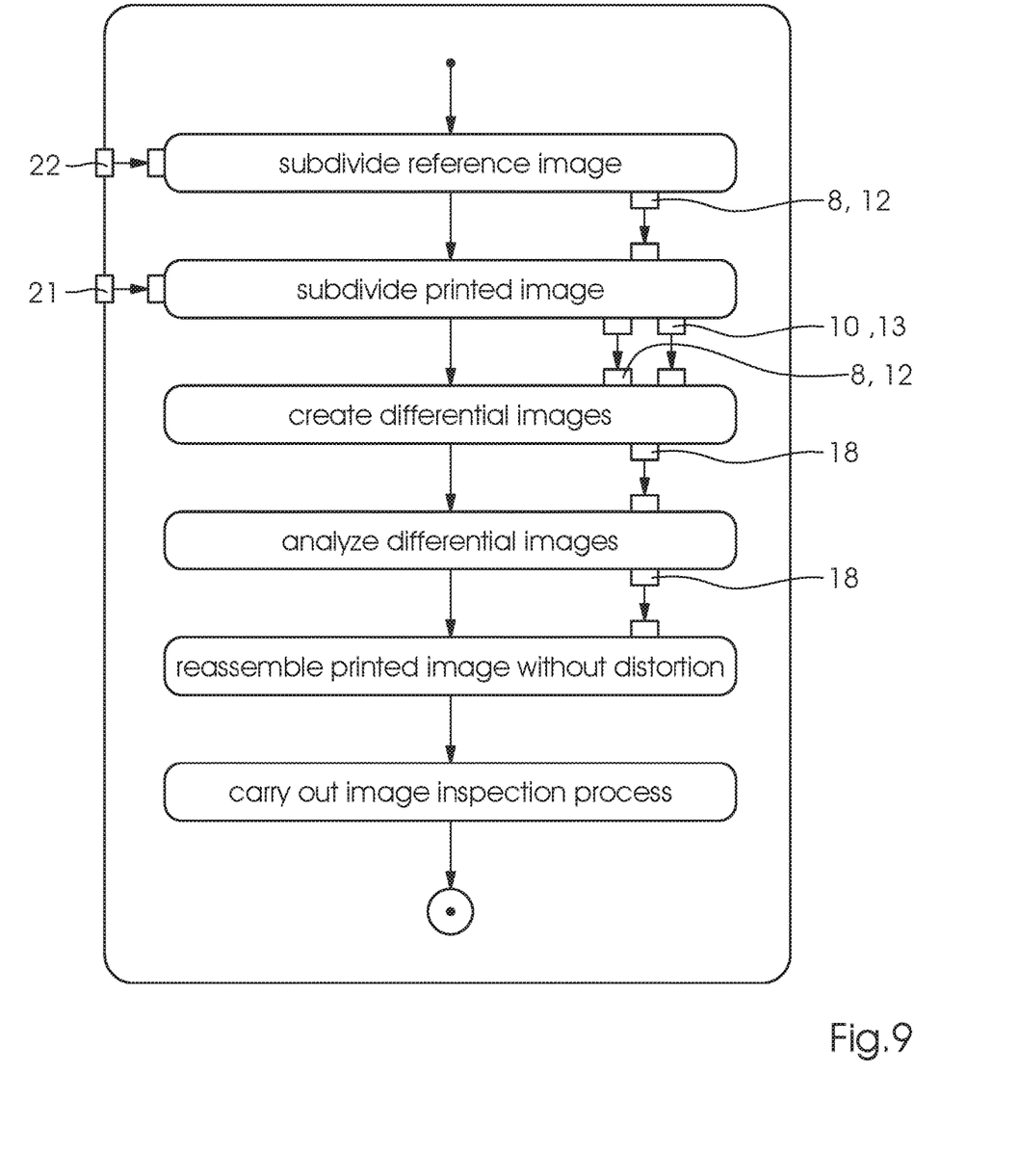
FIG. 9 is a flow chart of the method of the invention.

A schematic flow chart of a preferred embodiment of the method of the invention is shown in FIG. 9. A digital pre-press image is created as a reference image 22 on the basis of a rendered pre-press PDF of the original. Conversely, a printed image 21 logically is a camera image 21 taken of a printed sheet by the camera 5 in the printing machine 4. Image inspection processes for printing presses 4 frequently involve reference images 22 that are not precisely identical with the camera images 21. Some differences are due to camera distortions and sheet distortions, for instance caused by sheets that flip upward or flutter. In general, distortions need to be eliminated from the camera images 21 to ensure that the image inspection process works properly. This process needs to be in step with the printing speed.

Figure 3:
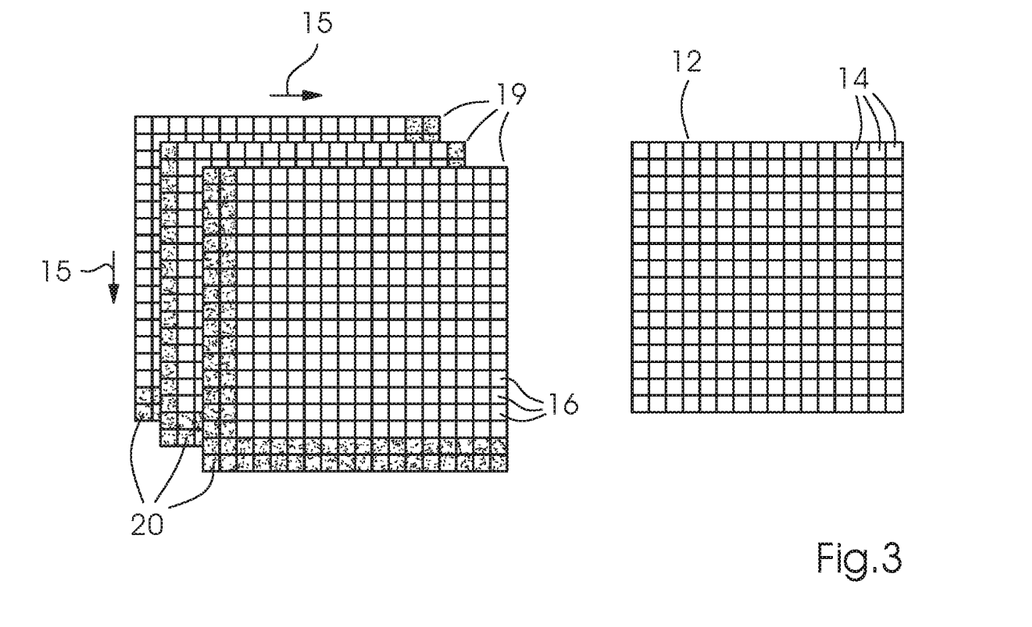
FIG. 3 is a plan view illustrating an example of a pixel-by-pixel shift of the printed image part.
Figure 4:
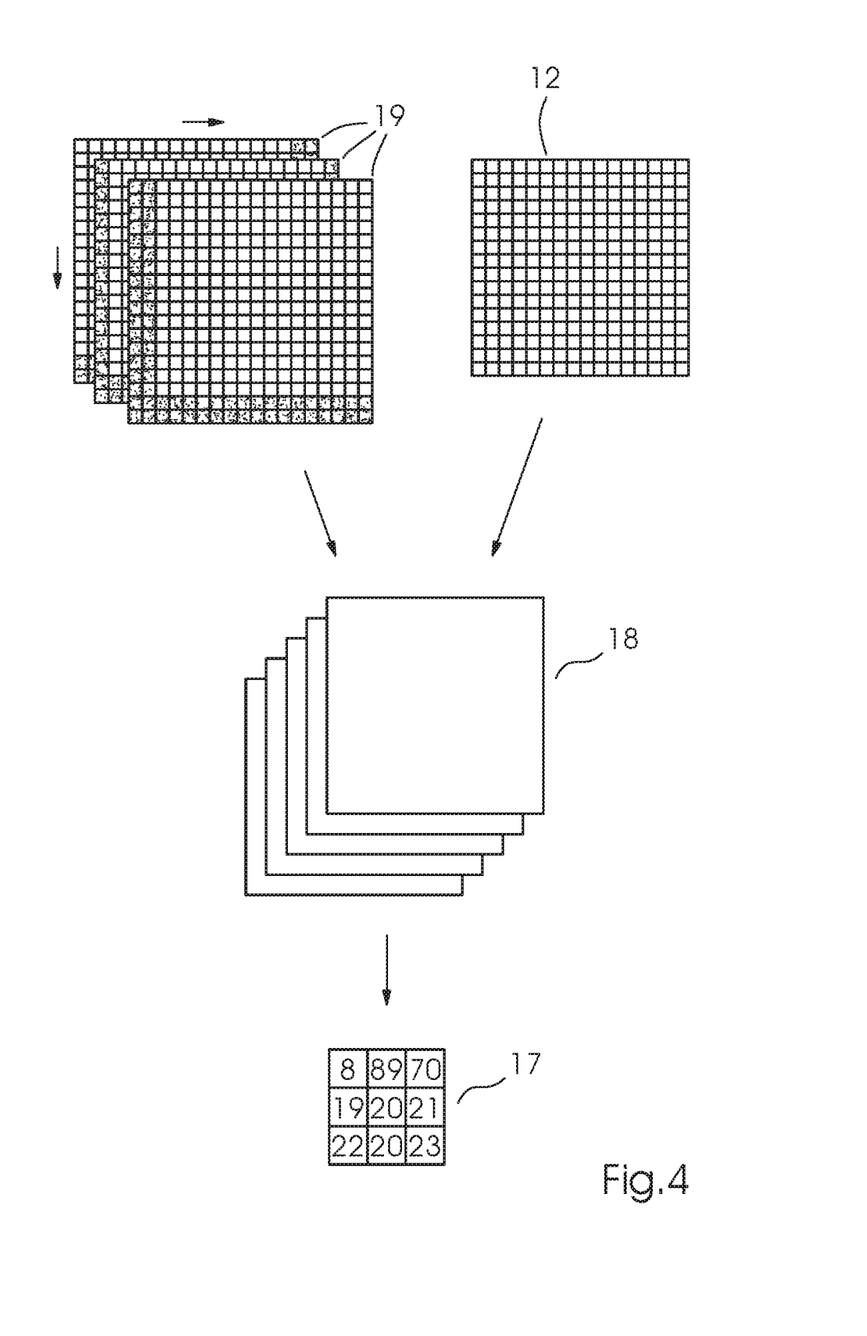
FIG. 4 is a plan view illustrating the calculation of the difference between the printed image part and the reference image part.

The algorithm of the method of the invention is executed on the computer 3, 6 as follows: both images 21, 22 are divided into sections 8, 10 in a similar way. This is done first and foremost because there is a number of cameras 5, each one of which only records a part or section 10 of the entire printed image 21. The sections 8, 10 of the entire printed image 21 and of the reference image 22 continue to be subdivided into square image parts 12, 13, also referred to as tiles 12, 13, as shown by way of example in FIG. 2. In addition to the tiles 12, 13, the figure also shows an actual printed copy 9, 11 in the shape of writing. The lower part of FIG. 2, which represents the recorded section 10 of the printed image 21, illustrates the distortion 11 of a digital print in the recorded section 10. Due to the distortion, a meaningful comparison with the section 8 of the reference image 22 in the course of the image inspection process is difficult to achieve. Thus, for every one of these tiles 12, 13, an attempt is made to find the optimum position of the camera image section 10 in the camera image part 13 relative to the reference image section 8 by a pixel-by-pixel shift of the tiles 12, 13. This is illustrated for the given example in FIG. 3, the left-hand portion of which illustrates a number of square camera image parts 19, each one with a respective pixel-by-pixel shift 15, whereas the right-hand portion illustrates the square pre-press/reference image part 12. Both for the square camera image parts 19 and for the square pre-press image parts 12, individual pixels 14, 16 that are necessary to represent the digital image parts 12, 19 are shown. In this context, it is important to note that during the shift, virtually two "tiles" exist for the camera image part 13 to be examined: an "inner tile" which is unshaded in FIG. 3, which represents the image part 13 to be shifted, and which is of the same size as the corresponding tile of the reference image section 8; and an "outer tile" which further includes a region 20 of overlap shown by the shaded section in FIG. 3, in addition to the inner tile. This region 20 of overlap only exists in the camera image section 10, but not in the reference image section 8. The pixel-by-pixel shift 15 may only occur in this region 20 of overlap because otherwise image gaps would be created. Then a respective differential image 18 is created for every one of the different shifts in the x and y directions and the value of the difference is saved as a quality feature of the position in question in a result matrix 17 as shown in FIG. 4. The computer 3, 6 memorizes the position with the smallest difference.

Figure 5:
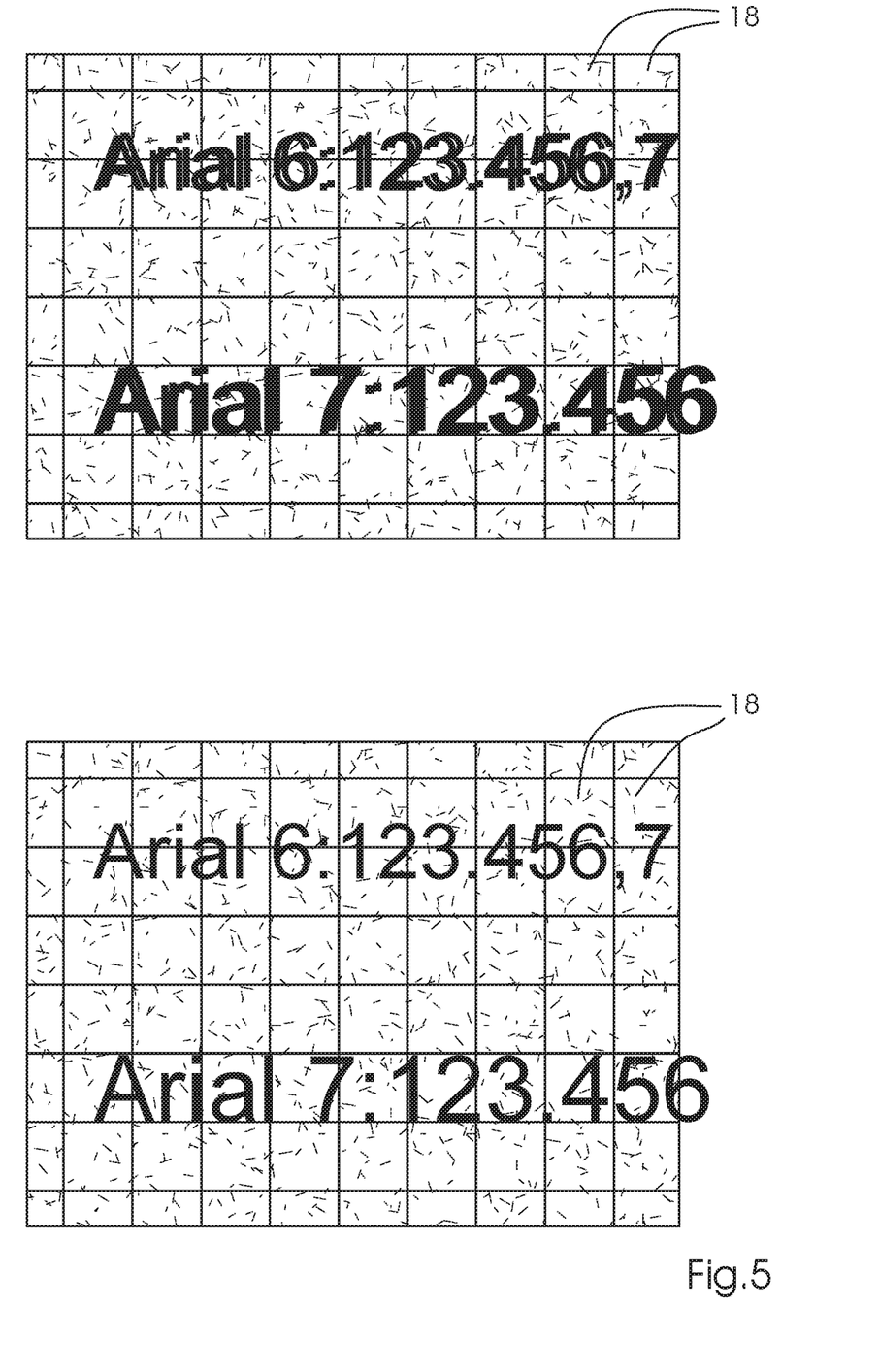
FIG. 5 is a plan view illustrating an example of the assembled printed image.

In a following step, the computer assembles a distortion-free printed image section 10 tile 13 by tile 13 by selecting the respective tile position that has the smallest difference and copies it to the corresponding target position. FIG. 5 illustrates the result of a printed image section 10 that is formed of differential images 18 of square pre-press/camera image parts 12, 13 by way of example for a better understanding. The upper image is formed of differential images 18 without the shift 15 in accordance with the invention whereas the lower image is formed of image parts 18 with a pixel-by-pixel shift 15 in accordance with the invention. The difference in terms of distortions that remain in the untreated differential image is clearly visible.

In an alternative embodiment, the image parts, i.e. tiles 12, 13, may have other shapes such as triangles or other polygons.

Both process steps may to a high degree be executed in parallel. Every tile 12, 13 may be calculated in a separate process. When an image 8, 10 is divided into 1000 tiles in the case of a single-processor computer system, these tiles 12, 13 need to be calculated successively. Modern graphics cards having, for instance, 1000 processors may make the calculations in parallel, allowing the entire process to be calculated in a single step. This provides an acceleration by a factor 1000 and even more, which means a considerably enhanced performance of the distortion elimination process compared to the known methods of the prior art.

Once the distortions have been eliminated, the actual image inspection process may be carried out. For this process, there are three possible approaches:

First case: The comparison for inspection purposes takes place between the distortion-free tiles 13 of the camera image section 10 and the tiles 12 of the reference image section 8.

Second case: The comparison takes place after the distortion elimination process between the camera image section 10 and the reference image section 8.

Third case: The comparison takes place between the distortion-free entire printed image 24, which has been reassembled from the distortion-free camera image sections 10, 10a, 10b, and the entire reference image.

A disadvantage of the first case is that the regions 20 of overlap are inspected twice. Another problem is to find a way that makes sense for reassembling defects that are located in the region 20 of overlap and have thus been divided. Both aspects result in a prolonged inspection time.

In the second case, two steps need to be carried out successively, which results in a prolonged inspection time. This also applies to the third case.

Figure 6:
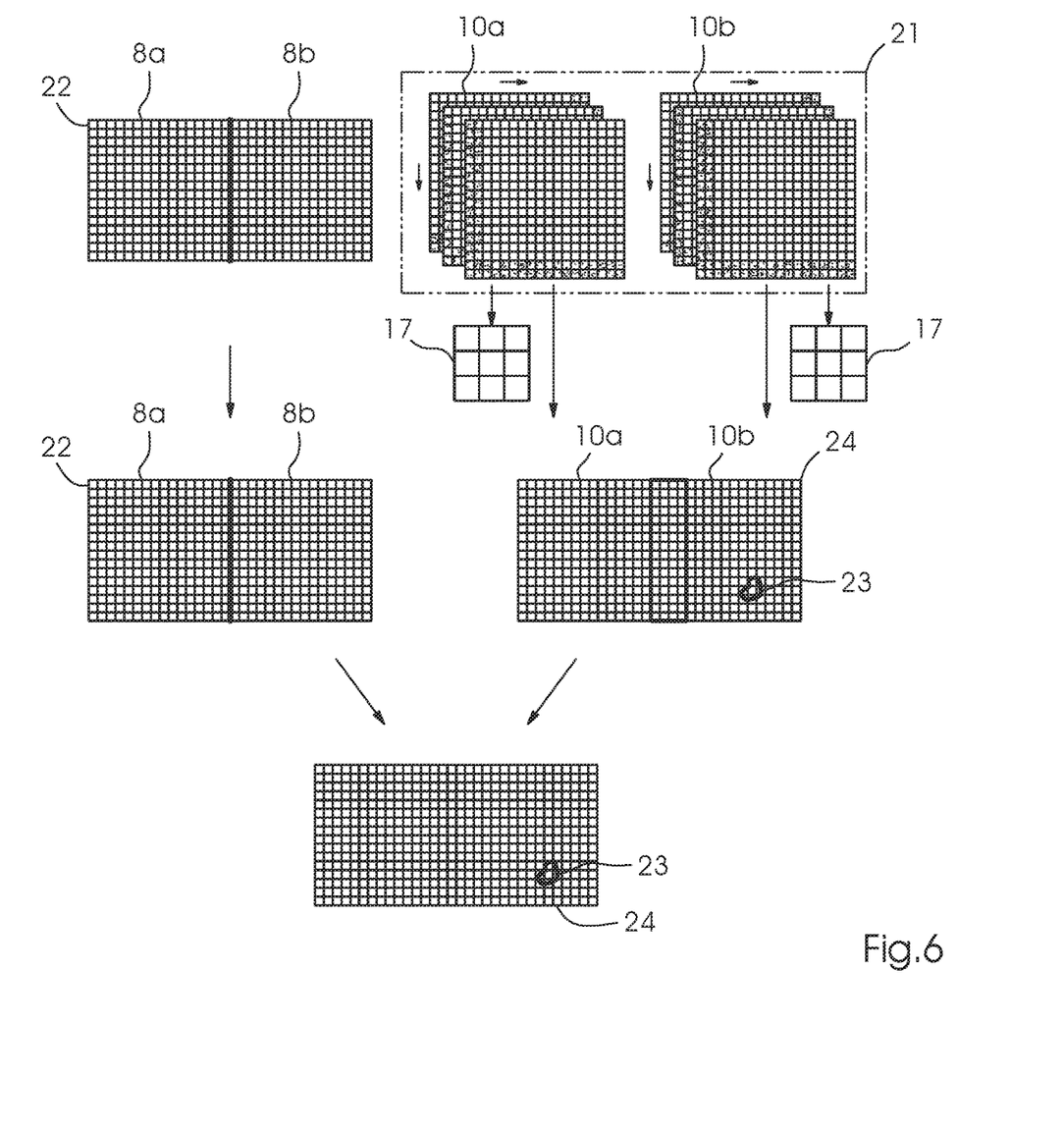
FIG. 6 is a plan view illustrating an improved algorithm for inspecting multiple camera image parts/tiles.

In order to avoid this, there is another preferred exemplary embodiment of the method of the invention, an embodiment that reduces run time and is schematically shown in FIG. 6.

Figure 2:
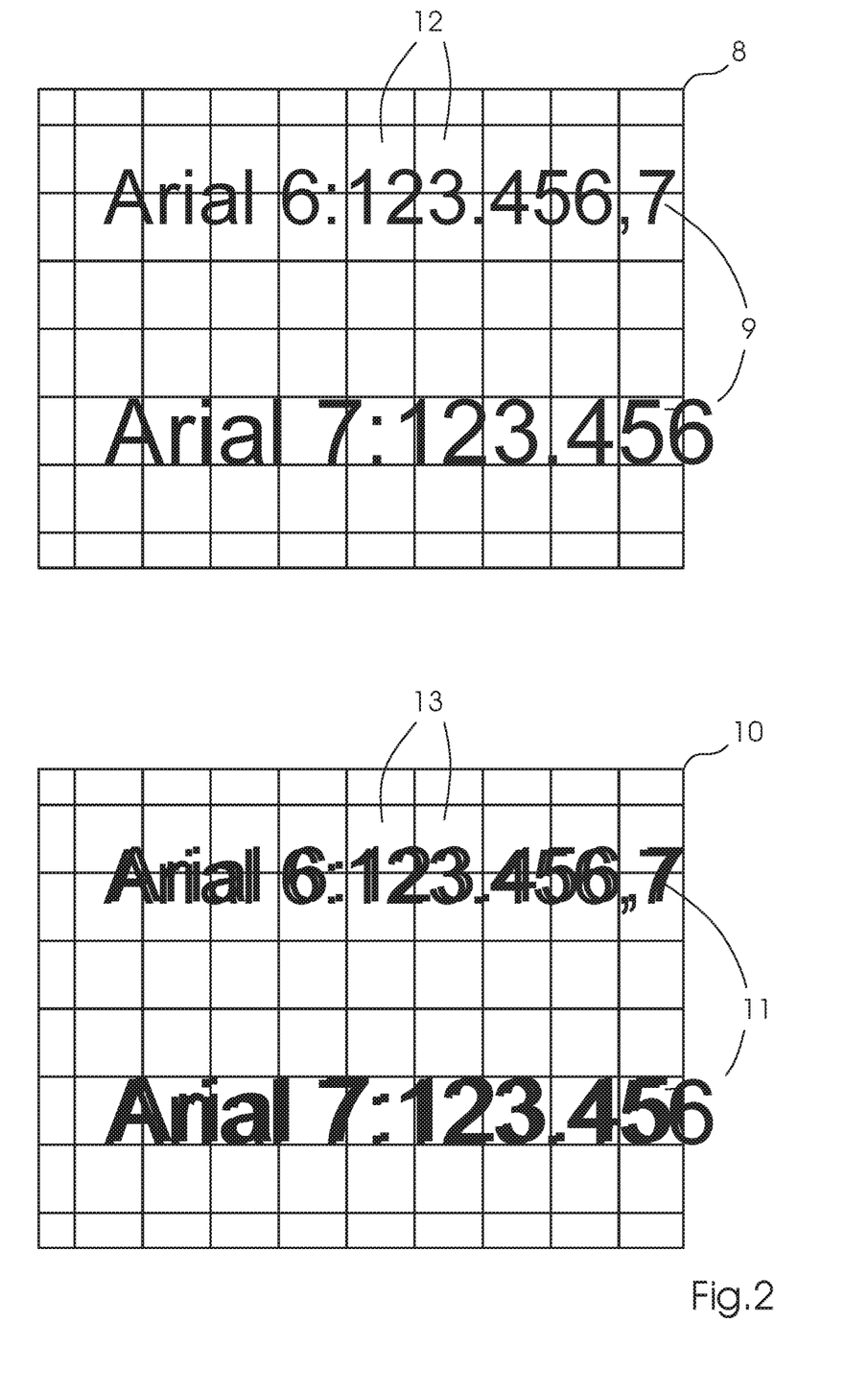
FIG. 2 is a plan view illustrating an example of a division of a reference image and a printed image into image parts/tiles.

In this embodiment, the reference image section 8 and camera image section 10 are likewise subdivided into a plurality of tiles 12, 13 as shown in FIG. 2. In this case, too, the tiles 13 of the camera image section 10 are aligned in accordance with the tiles 12 of the reference image section 8. In this way, sheet distortions are eliminated as described above. This concludes the process for the current section 10a of the printed image 21.

Figure 7:
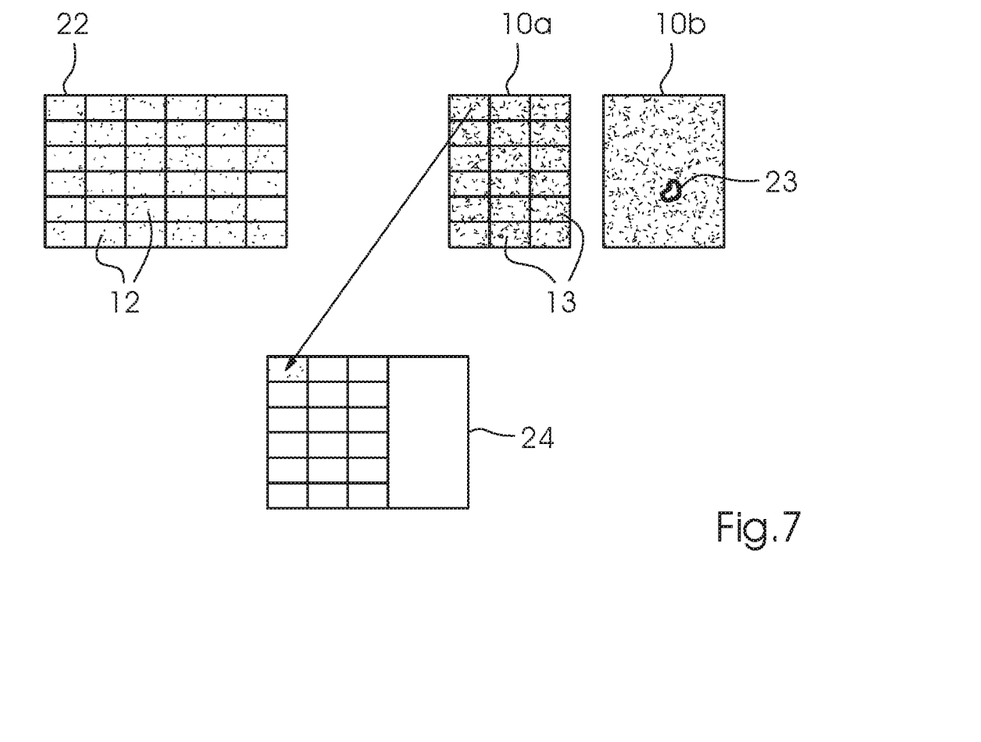
FIG. 7 is a plan view illustrating the start of the improved algorithm.
Figure 8:
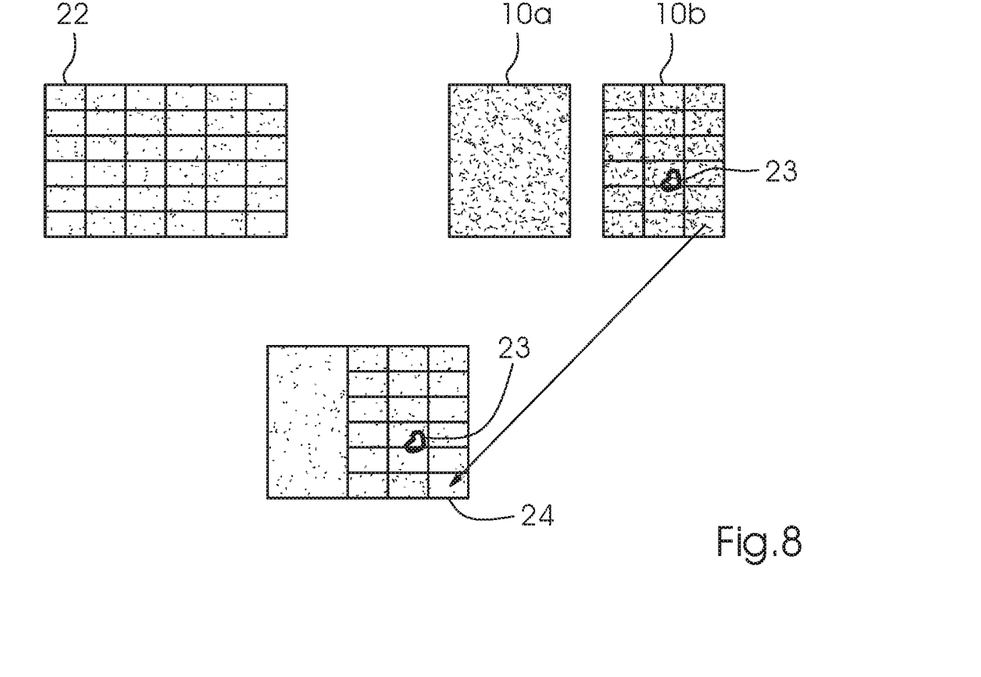
FIG. 8 is a plan view illustrating the end of the improved algorithm.

In most cases, however, the current camera section 10a does not represent the entire printed image 21. If a further camera section 10b exists, it is subjected to the distortion elimination process in a corresponding way. The first tile 13 of the distortion-free printed image 10a is now repositioned in the now-distortion-free entire printed image 24 and not in a separate camera section 10a as it was the case in the previous exemplary embodiments. The same is done with the remaining tiles 13. They are positioned on the entire printed image 24 in the same way to finally create a distortion-free reassembled entire camera image 24 at the end of the distortion elimination process. The beginning of this embodiment at camera section 10a is shown in FIG. 7; the end at camera section 10b is shown in FIG. 8. The entire reference image 22 is divided into its reference image sections 8a and 8b in a corresponding way.

Due to this process, the inspection run times for multiple sections 8, 8a, 8b as well as 10, 10a, 10b may be considerably shortened. This entire printed image 24 may now be used for the actual image inspection process to detect existing image defects 23. An example of an image defect 23 is indicated in FIGS. 6, 7, 8.

LIST OF REFERENCE SYMBOLS

1 operator
2 image recording system
3 control unit
4 printing machine
5 image sensor
6 image processor
7 display
8, 8*a*, 8*b* digital section of pre-press image (reference image)
9 digital copy in the section of the pre-press image
10, 10*a*, 10*b* recorded section of digital printed image (picture taken by camera)
11 digital copy in the section of the recorded printed image
12 square pre-press image part (tile)
13 square camera image part (tile)
14 pixel in the pre-press image part
15 pixel-by-pixel shift in x/y direction
16 pixel in the camera image part
17 result matrix
18 differential images of square pre-press image part and camera image part
19 camera image parts shifted pixel by pixel
20 region of overlap
21 distorted entire printed image
22 entire reference image
23 image defect
24 distortion-free entire printed image

The invention claimed is:

1. A method for inspecting images on printed products in a machine for processing printing substrates, the image inspection method comprising the following steps:
   recording and digitizing produced printed products by using at least one image sensor in an image recording system;
   comparing the recorded digital printed images with a digital reference image by using a computer;
   subjecting the recorded digital printed images to a digital distortion elimination process beforehand by using the computer to digitally eliminate the distortions by dividing the print and reference images into respective image parts and adapting the printed image parts pixel by pixel in terms of their positions in the printed image to minimize a difference between the printed image parts and the respective reference image part;
   upon a deviation of the recorded digital distortion-free printed images from the digital reference image, removing printed products having been found to have a defect;
   using the computer to carry out the pixel-by-pixel positional adaptation as a shift of the printed image part in at least one of an x or y direction;
   providing a positional adaptation to attain a minimum difference between the printed image parts and the respective reference image parts by using the computer to make multiple shifts, create a differential image relative to the respective reference image part for every shift of the printed image part, and then select the shifted printed image part having a differential image with a smallest difference; and
   implementing an image inspection based on a distortion-free printed image by using the computer to copy the printed image parts with the smallest difference into a respective target position in the recorded, distortion-free digital printed image and to use the obtained recorded, digital and distortion-free printed image for the image inspection method.

2. The method according to claim 1, which further comprises providing the image parts of the print and reference images with identical sizes.

3. The method according to claim 2, which further comprises using the computer to divide the printed images into overlapping image parts.

4. The method according to claim 3, which further comprises providing a degree of overlap between the individual image parts of the printed images corresponding to a degree of a maximum positional adaptation.

5. The method according to claim 1, which further comprises using the computer to calculate the smallest difference in the differential image by applying thresholds and to save a difference value of every shifted printed image part in a result matrix.

6. The method according to claim 1, which further comprises providing the image parts with a polygonal shape.

7. A method for inspecting images on printed products in a machine for processing printing substrates, the image inspection method comprising the following steps:
   recording and digitizing produced printed products by using at least one image sensor in an image recording system;
   comparing the recorded digital printed images with a digital reference image by using a computer;
   subjecting the recorded digital printed images to a digital distortion elimination process beforehand by using the computer to digitally eliminate the distortions by dividing the print and reference images into respective image parts and adapting the printed image parts pixel by pixel in terms of their positions in the printed image to minimize a difference between the printed image parts and the respective reference image part;
   upon a deviation of the recorded digital distortion-free printed images from the digital reference image, removing printed products having been found to have a defect;
   using the computer to carry out the pixel-by-pixel positional adaptation as a shift of the printed image part in at least one of an x or y direction;
   providing a positional adaptation to attain a minimum difference between the printed image parts and the respective reference image parts by using the computer to make multiple shifts, create a differential image relative to the respective reference image part for every shift of the printed image part, and then select the shifted printed image part having a differential image with a smallest difference; and
   carrying out an image inspection with a distortion-free printed image by using the computer to compare the printed image parts with the smallest difference from the corresponding reference image parts and then copy the printed image parts to respective target positions thereof in the recorded digital and distortion-free printed image.

8. The method according to claim 6, which further comprises providing the image parts as rectangles, squares or triangles.

* * * * *